United States Patent

Suwa et al.

[11] 4,084,669
[45] Apr. 18, 1978

[54] COMPOSITE COLLECTOR

[75] Inventors: Masateru Suwa; Katsuhiro Komuro, both of Hatachi, Japan

[73] Assignee: Hitachi, Ltd., Japan

[21] Appl. No.: 717,374

[22] Filed: Aug. 24, 1976

[30] Foreign Application Priority Data

Aug. 25, 1975 Japan .................. 50-102164

[51] Int. Cl.² ............... B60L 5/08; H01R 39/56; H01R 41/00
[52] U.S. Cl. ................... 191/45 R; 310/228; 310/251
[58] Field of Search ........... 191/45 R, 49, 50, 55, 191/59, 59.1, 62, 65; 310/228, 251, 252, 253; 29/182, 182.2; 75/201, 208 R

[56] References Cited

U.S. PATENT DOCUMENTS 2,319,240  5/1943  Larsen ...................... 310/252
3,177,564  4/1965  Reynolds ................... 75/201

FOREIGN PATENT DOCUMENTS 688,158  2/1953  United Kingdom ............. 310/228

Primary Examiner—Trygve M. Blix
Assistant Examiner—Reinhard J. Eisenzopf
Attorney, Agent, or Firm—Craig & Antonelli

[57] ABSTRACT

A collector for collecting and passing an electric current in sliding contact, which is used for an electric train, a crane, a hoist or the like, said collector comprising a substrate metal or metal matrix into which a solid lubricant is dispersed, a layer of a prescribed thickness containing dispersed therein particles of the solid lubricant having a particle size of up to 2.5 mm, which is formed on the sliding surface side of the collector, and a solid lubricant-free layer of a prescribed thickness formed on the opposite surface side of the collector.

21 Claims, 4 Drawing Figures

COMPOSITE COLLECTOR

BACKGROUND OF THE INVENTION (1) Field of the Invention:

The present invention relates to a novel solid lubricant-containing collector having an excellent abrasion resistance and to a process for the preparation of this novel collector.

(2) Description of the Prior Art:

In general, collectors used for electric trains, cranes, hoists or the like are composed of copper type sintered alloys, lead impregnated iron type sintered alloys or aluminum type sintered alloys. Each of these collector materials, however, is defective in that since the material is inferior in its electric conductivity, thermal conductivity, abrasion resistance and strength, consequently the life of the collector is very short. The reason for these defects is that since a solid lubricant is uniformly dispersed by sintering in production of each of the foregoing collector materials, a great number of voids are present in the alloy structure and sintering cannot be performed completely until a theoretical density is attained. If the electric conductivity is low, a sufficient electricity collecting efficiency cannot be obtained. If the thermal conductivity is low, the material is heated by the resistance during the electricity-collecting operation and since the heat discharge rate is low, the temperature is further elevated and the collecting efficiency is lowered. If the abrasion resistance and the strength are low, in case of a collector of an electric train for collecting electricity from an aerial line in sliding contact therewith, the collector is readily worn by sliding and its life is very short. Furthermore, a collector of a material having a low strength involves a danger that it will be broken under a pressing force.

As will be apparent from the foregoing illustration, a collector material is required to have high electric conductivity, high thermal conductivity, excellent abrasion resistance and high strength. The life of a collector depends greatly on the abrasion resistance of a collector material, and a material having a high abrasion resistance is especially required for production of a collector.

It is also required of a collector that the phenomenon of "separation from a line" should be reduced. By this "line separation" phenomenon is meant a phenomenon in which a collector for collecting electricity while sliding, such as a pantograph, separates from an aerial line during running and electricity is not collected. The line separation ratio is expressed in terms of the ratio of the line separation distance to the running distance. Accordingly, it is required that the collector should have a low line separation ratio. This line separation ratio is varied dependent on the weight of the collector and the thickness of the oxide film. As the weight of the collector is heavy, the line separation ratio is increased. An arc discharge is caused by the line separation, damaging the aerial line or collector, and further, the running speed is reduced. In order to reduce the line separation ratio, it is necessary to lower the running speed of the train or to increase the tension of the aerial line or the pressing force of the pantograph. Reduction of the running speed is contradictory to the desirable high speed operation and increase of the pressing force is not preferred because abrasion damages of the aerial line or collector are made serious. In other words, use of a heavy collector results in increase of the pressing force and abrasion damages. In conclusion, in order to reduce the line separation ratio, it is necessary to lighten the weight of a collector. Namely, reduction of the line separation ratio can be attained by the use of a collector material having a low specific gravity or being excellent in strength, abrasion resistance and electric conductivity.

SUMMARY OF THE INVENTION

It is therefore a primary object of the present invention to provide a collector which is excellent in the abrasion resistance and has high electric conductivity and strength and a long life, and a process for the preparation of such collector.

In accordance with the present invention, there is provided a composite collector for collecting and passing an electric current in sliding contact, which is constructed of an integral cast metal and comprises on the electric current-passing sliding surface side a second layer of a prescribed thickness including particles of a solid lubricant having a particle size of up to 2.5 mm, dispersed in the substrate of said metal, and a first layer of a prescribed thickness composed solely of the metal and free of the solid lubricant on the side of the surface opposite to said sliding surface.

DESCRIPTION OF THE INVENTION

In the term "composite collector" as used herein means a member for collecting electricity from an aerial line in sliding contact with the aerial line, such as a slider of a pantograph, a collector plate, a collector shoe or a trolley wheel, and not only a member collecting electricity while sliding but also a member which does not collect electricity while sliding but collects electricity when the sliding movement is stopped is included in the concept of the composite collector.

The composite collector of the present invention is constructed of an integral cast body of a substrate metal having a high electric conductivity and comprises a side having a sliding surface layer of solid lubricant particles of a particle size of up to 2.5 mm dispersed in the substrate metal and a lubricant-free layer on a surface of the side of the body opposite to the sliding surface having enough strength for friction and impact force at running. Accordingly, the sliding surface side is excellent in the abrasion resistance, and the opposite side is excellent in the strength because no solid lubricant is contained therein. Therefore, the collector as a whole has a high abrasion resistance and a high strength, and hence, it has a very long life.

In conventional collectors, a solid lubricant is dispersed uniformly in the entire structure, and in order to maintain the strength at a necessary level, the content of the solid lubricant is inevitably limited. Therefore, the abrasion resistance cannot be sufficiently improved. In contrast, in the present invention, the content of the solid lubricant is increased on the sliding surface side and hence, a sufficient abrasion resistance is maintained. The strength is reduced with increase of the content of the solid lubricant and the strength is high as the lubricant content is low. In the composite collector of the present invention, the solid lubricant is not incorporated on the side of the surface opposite to the sliding surface, and hence, the strength required of the collector is sufficiently maintained. Further, it has been confirmed that the total weight of the collector can be reduced by adoption of the above structure as compared with conventional collectors. As a result, the line separation ratio can be reduced, and since the pressing force of the collector can be reduced, the abrasion is lowered and the life of the collector is prolonged.

The collector of the present invention comprises a solid lubricant-free layer on the side of the surface opposite to the sliding surface, and when the thickness of this layer is at least one-fifth of the entire thickness of the collector and the content of the solid lubricant on the sliding surface side is much higher than on the opposite side, it has been confirmed that both the strength and abrasion resistance are further enhanced. More specifically, when the thickness of the solid lubricant-free layer is smaller than one-fifth of the entire thickness of the collector, no sufficient strength can be obtained and the intended effect cannot be attained. It has been confirmed that if the thickness of the solid lubricant-free layer is one-third to one-half of the entire thickness of the collector, especially high strength and a much prolonged life is obtained.

Aluminum, copper, silver, gold and alloys thereof having a specific resistance lower than 200 $\mu\Omega$-cm are most preferred as the substrate metal having a high electric conductivity, and nickel, iron, cobalt and alloys thereof come next. When such metal or alloy has a tensile strength of at least 7.5 Kg/mm$^2$ at room temperature and a melting point lower than 1600° C., it shows a high electric conductivity, a high strength and an excellent abrasion resistance and when such metal or alloy is used as the substrate metal, a collector having a very long life can be obtained. If the specific resistance is higher than 200 $\mu\Omega$-cm, the electricity conductivity by sliding contact is reduced and good results are not obtained. If the tensile strength is lower than 7.5 Kg/mm$^2$, in a collector receiving a high pressing force, for example, a sliding collector plate of a pantograph, deformation is readily caused because of the lack of the strength and good results are not obtained. When a metal or alloy having a melting point higher than 1600° C. is used, it is difficult to prepare a collector including a solid lubricant-containing layer and a solid lubricant-free layer.

Conventional collectors including at least one solid lubricant selected from molybdenum disulfide, graphite and the like are prepared by sintering. However, as pointed out hereinbefore, these collectors prepared by sintering are inferior in the abrasion resistance and the strength and have a high line separation ratio and a short life.

In the present invention, in addition to graphite and molybdenum disulfide (MoS$_2$), there may be employed tungsten disulfide (WS$_2$), molybdenum diselenide (MoSe$_2$), tungsten diselenide (WSe$_2$), tantalum diselenide (TaSe$_2$), tantalum disulfide (TaS$_2$) calcium fluoride (CaF$_2$), barium fluoride (BaF$_2$), lithium fluoride (LiF$_2$), boron nitride (BN) and mica as a solid lubricant.

The solid lubricant is composed of an incompatible substance having metallurgically no solubility in the substrate metal, and it has a self-lubricating property. It is necessary that the specific gravity of the solid lubricant must be different from the specific gravity of the substrate metal by at least 10%. If this requirement is satisfied, at the melting step the separation of a solid lubricant-containing layer and a solid lubricant-free layer can be accomplished very conveniently. It is preferred that the specific gravity of the substrate metal be not higher than 3 g/cm$^3$.

It is preferred that the content of the solid lubricant be in the range of from 5 to 50% by weight in the lubricant-containing portion of the collector. More specifically, if the lubricant content is lower than 5%, no sufficient abrasion resistance can be obtained and if the lubricant content exceeds 50%, the strength is drastically reduced.

In the present invention, a collector having excellent abrasion resistance and strength is obtained only when the particle size of the solid lubricant is up to 2.5 mm, and when the particle size of the solid lubricant is larger than 2.5 mm, the abrasion resistance and the strength are drastically lowered. More specifically, if the particle size is small, distances among the solid lubricant particles are shortened and therefore, the abrasion resistance is enhanced. Further, since slip of the substrate metal is conveniently prevented, the strength is further enhanced.

The composite collector of the present invention is prepared by a melting and solidifying method so that the solid lubricant is dispersed on the sliding surface side and the solid lubricant is not incorporated on the opposite side.

Conventional collectors have heretofore been prepared by dispersing a solid lubricant uniformly in the substrate metal according to a sintering method. As pointed out hereinbefore, these conventional collectors are insufficient in the strength and the abrasion resistance. It has been confirmed that when a collector is prepared by a melting and casting method according to the present invention, the strength and the abrasion resistance can be remarkably enhanced and a very long life can be imparted to the resulting collector.

According to the preparation process of the present invention, a solid lubricant having no solubility in a metal or alloy as the substrate metal is thrown in a melt of the substrate metal and the melt is solidified at a solidifying rate controlled so that a second layer containing the solid lubricant dispersed therein and a first layer free of, that is, not containing, the solid lubricant are formed. More specifically, the process of the present invention is based on the finding that when the specific gravity of the solid lubricant is sufficiently higher or lower than the specific gravity of the matrix metal, the solid lubricant is readily deposited in the lower portion of the melt or is allowed to rise in the upper portion of the melt, whereby a layer containing an effective lubricant content and a lubricant-free layer are formed. Accordingly, a collector excellent in the abrasion resistance and having a structure of a high strength can be prepared by the process of the present invention.

As conventional means for dispersing a solid lubricant into an alloy, there have heretofore been adopted methods in which both the materials are mixed in the powdery state, the mixture is molded and the molded article is then sintered or impregnated. In these methods, however, various limitations are imposed on the shape, the dimension and the strength. If the solid lubricant is dispersed in a molten alloy and the metal is cast in a mold and solidified, the shape and dimension can be freely chosen and the strength can be made about two times as high as the strength attainable by the conventional methods. In the present invention, dispersion of the solid lubricant into a molten alloy can be accomplished by coating the surfaces of particles of the solid lubricant with another metal such as copper or nickel which has metallurgically a solid-soluble or wettable compatibility with the substrate metal, subjecting the coated particles to a surface treatment and throwing them in the melt maintained at a suitable temperature determined on the alloy composition.

The most characteristic feature of the present invention is that the solidification of the lubricant-dispersed melt is controlled so that the solid lubricant is made present at a higher content in the vicinity of a top face of a sliding plate of a pantograph or the like which is to fall in sliding contact with an aerial line and the solid lubricant is hardly present in the lower portion. More specifically, the melt is gradually cooled while solidifying, and the solid lubricant is caused to rise in the vicinity of the top surface of the cast ingot or is sedimented in the vicinity of the lower surface of the ingot. For instance, the rising velocity of various size of graphite particles in the aluminum molt are as follows, 19 $\mu$/sec at 10 $\mu$dia., 1.9 mm/sec at 100 $\mu$ dia. and 190 mm/sec at 1000 $\mu$ dia. Accordingly, the solid lubricant is dispersed at a higher content on the side of the sliding surface of the resulting collector, for example, a sliding plate of a pantograph, and the abrasion resistance and other sliding properties are enhanced on the side of the sliding surface. On the other hand, on the opposite surface side, since the solid lubricant is not distributed, the strength is maintained at a high level, the electric resistance is low and a good heat dischargeability is attained.

According to the present invention, a collector having a low line separation ratio can be provided. It has been found that the line separation ratio is greatly influenced by the weight of the material, and based on this fining, aluminum having a low specific gravity is chosen as the matrix in the present invention. More specifically, it has been found that when aluminum is used as the matrix and at least one member such as graphite, molybdenum disulfide and the like is incorporated as the solid lubricant, a collector material having a light weight and an excellent abrasion resistance can be obtained. It was also found that if at least one element selected from silicon, copper, magnesium and nickel is added to the matrix, a collector material having a high toughness can be obtained.

Appropriate contents of respective components have been determined according to respective application conditions so that an excellent abrasion resistance can be attained during the electric current passing operation, a good followability to the aerial line can be attained, the impact load by the aerial line can be reduced, and that even if an arc is generated, a sufficient strength fully resisting the arc and a sufficient arc resistance can be manifested.

The significance of addition of each of basic components of the cast alloy of the present invention will now be described.

The reason why aluminum is preferably used as the main component of the substrate is that aluminum has a low specific gravity and a low electric resistance and is excellent in the resistance to oxidation and sulfiding. The reason why copper is incorporated into aluminum is that the strength and hardness are improved by addition of copper. With increase of the amount incorporated of copper, the strength is improved, but if the copper content exceeds 10%, precipitation of a brittle intermetallic compound such as $CuAl_2$ is increased to cause brittlement of the alloy. If the copper content is lower than 0.5%, no substantial effect of improving the strength can be attained. The copper coated on solid lubricants is also dissolved in the substrate during solidification. Accordingly, it is preferred that copper be incorporated in an amount of 0.5 to 10% by weight.

Silicon is effective for improving the strength, hardness and arc resistance and especially improving the resistance to the abrasive wearing. If the silicon content is lower than 5% by weight, no substantial improvement of the abrasion resistance can be attained. With increase of the silicon content, the abrasion resistance and arc resistance can be improved, but if the silicon content exceeds 25%, the toughness is lowered and a prescribed strength cannot be obtained. When silicon is added, the strength is remarkably enhanced by addition of copper and magnesium in combination, and in this case, the matrix can be further enforced by the solution treatment and the aging treatment. In the case where such heat treatments are conducted, it is preferred that copper be incorporated in an amount of 1 to 4% and magnesium be incorporated in an amount of up to 1%.

DETAILED DESCRIPTION OF THE PREFERRED EMBODIMENTS

The present invention will now be described by reference to the following examples that by no means limit the scope of the invention.

EXAMPLE 1

Aluminum metal is molten, and graphite powder (particle diameter 170–500$\mu$m) coated with nickel by non-electrolytic plating is thrown into the melt and molten metal is stirred in order to homogenize. Then, the melt is cast into a mold preheated at 200° C. and is gradually cooled so that the graphite powder rises in the upper portion of the melt, whereby a collector material of the present invention comprising a graphite-dispersed layer of about 40 mm thickness and a graphite-free layer about 10 mm thickness is obtained. In the graphite-dispersed layer, the graphite content is about 20% by weight and in the substrate the nickel content is 5.3% by weight.

For comparison, an aluminum alloy containing 10% of graphite in the uniformly dispersed state and having a nickel content of 5.3% by weight is prepared by sintering.

Each alloy is subjected to the tensile test and the abrasion test at room temperature. The tensile strength of the alloy of the present invention is 7.5 Kg/mm$^2$ at the dispersed layer and that of the comparative alloy prepared by sintering is 5.0 Kg/mm$^2$. Thus, it is confirmed that the collector of the present invention has a higher strength. When the rotary abrasion test is conducted under a surface pressure of 7 Kg/cm$^2$ at a sliding speed of 4 m/sec while the sliding distance is adjusted to 3 km, the abrasion of the alloy of the present invention is 1.5 mm$^3$ while the abrasion of the conventional sintered product is 2.0 mm$^3$. Thus it is confirmed that the alloy of the present invention is excellent in the abrasion resistance.

EXAMPLE 2

Figure 1:
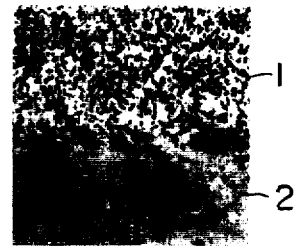
FIG. 1 is a diagram illustrating a macro-structure of a cast alloy for the collector of the present invention.
Figure 4:
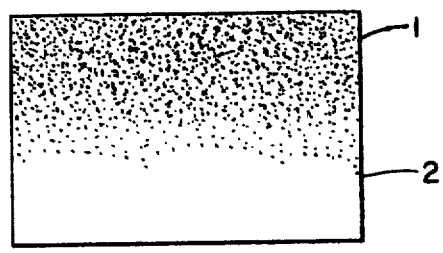
FIG. 4 is a cross-section of a composite collector of this invention.

FIGS. 1 and 4 show a macro-structure (1.5 magnifications) of the composite collector of the present invention. This collector is one prepared by melting an alloy comprising 12% by weight of silicon, 3% by weight of copper and 0.3% by weight of magnesium with the balance being aluminum, throwing into the melt graphite powder (particle diameter 170–500μm) coated with nickel by nonelectrolytic plating, casting the melt into a mold maintained at 200° C. after stirring and solidfying the melt. Since the melt has been cooled relatively gradually, the graphite powder rises in the upper portion of the structure and a graphite-dispersed layer 1 and a graphite-free layer 2 are formed in the resulting alloy structure. The graphite content is 20% by weight in the graphite-dispersed layer, and the nickel content in the substrate is 5.3% by weight. The so prepared ingot is heated at 500° C. for 1 hour and is then water-cooled. Then, the alloy is subjected to the aging treatment at 180° C. for 8 hours.

The tensile strength of the graphite-free layer 2 is 28 Kg/mm² at room temperature, and the elongation is 3% and the electric conductivity is 30% (5.74 μΩ cm) as measured according to IACS.

For comparison, an alloy comprising 8% by weight of silicon, 3% by weight of copper and 0.3% of magnesium with the balance being aluminum is prepared by the melting method and heat-treated in the same manner as described above. The so prepared sample has a tensile strength of 24 Kg/mm² at room temperature, an elongation of 5% and an electric conductivity of 35%. (specific resistance: 4.93 μ Ω cm)

Each of the above two samples has a higher tensile strength at room temperature than the tensile strength (14 Kg/mm²) at room temperature of an aluminum alloy prepared by dispersing lead uniformly by sintering (comprising 5% by weight of copper and 10% of lead with the balance being aluminum).

EXAMPLE 3

Figure 2:
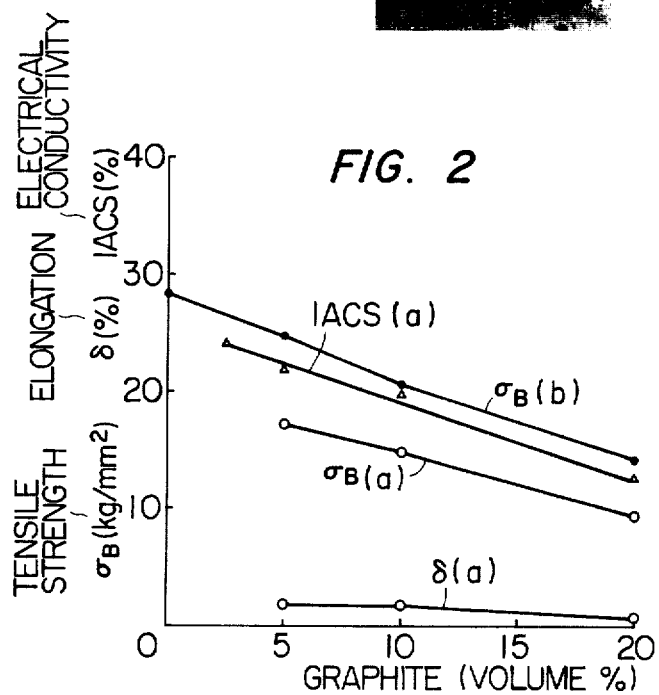
FIG. 2 is a graph illustrating relations of the amount of graphite to the tensile strength, the elongation and the electric conductivity.

FIG. 2 illustrates relations of the graphite content (17.4% by weight = 20% by volume) to the tensile strength, elongation and electric conductivity in the graphite-dispersed layer 1 shown in FIG. 1 and 4. Samples are prepared by melting an alloy comprising 12% by weight of silicon, 3% by weight of copper and 0.3% by weight of magnesium with the balance being aluminum, throwing nickel-coated graphite (graphite particle diameter 170–500μm) into the melt in a variable amount and casting the melt into a mold. The amount of nickel is increased in proportion to the amount incorporated of graphite; namely, the amount of nickel is 0.26% by weight per % by weight of graphite. In FIG. 2, curve (a) shows results obtained with respect to the as-cast sample and curve (b) shows results obtained with respect to the sample formed by heating the as-cast sample at 500° C. for 1 hour, water-cooling the sample and subjecting it to the aging treatment at 180° C. for 8 hours. It is seen that the strength, ductility and electric conductivity are reduced with increase of the graphite content. Although the tensile strength of the alloy prepared by dispersing graphite uniformly by sintering and comprising 5% by weight of copper and 5% by weight (6% by volume) of graphite with the balance being aluminum is 10 Kg/mm², the graphite-dispersed layer (containing 10% by weight of graphite) of the cast alloy collector of the present invention has a tensile strength of 17 Kg/mm² in the as-cast state and 24 Kg/mm² in the heat-treated state. Thus, the alloy of the present invention is much superior to the conventional alloy with respect to the tensile strength.

EXAMPLE 4

Figure 3:
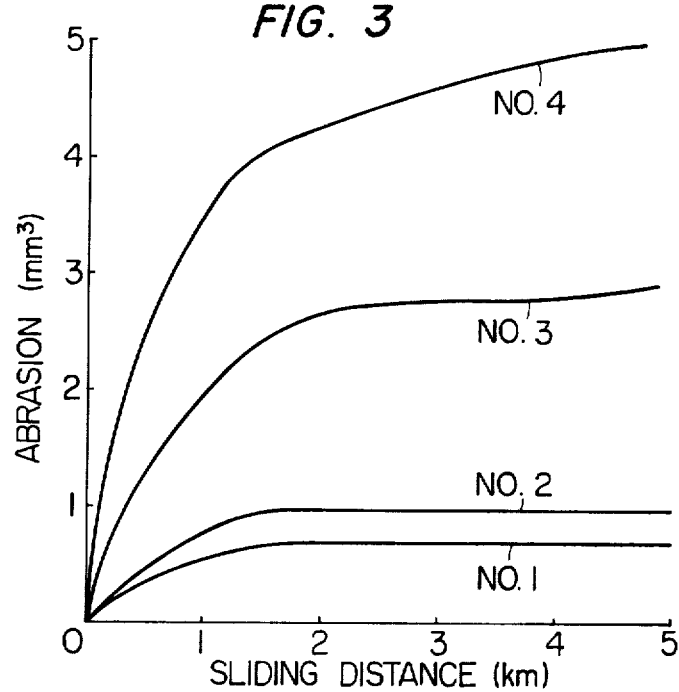
FIG. 3 is a graph illustrating the relation between the abrasion and the sliding distance observed at the abrasion test.

FIG. 3 illustrates results of the abrasion test made on the graphite-dispersed layer of the alloy of the present invention which constitutes the sliding surface to fall in sliding contact with an aerial line or the like and on the conventional alloy. The abrasion test is carried out under a surface pressure of 7 Kg/cm² and at a sliding speed of 4 m/sec. Curves Nos. 1 and 2 show results of the test made on collectors of the present invention and curves Nos. 3 and 4 show results of the test made on conventional collectors. The alloy of curve No. 1 comprises 12% by weight of silicon, 3% by weight of copper, 0.3% by weight of magnesium and 20% by weight of graphite (particle diameter 170–500μm) with the balance being aluminum, and the alloy of curve No. 2 comprises 8% by weight of silicon, 3% by weight of copper, 0.3% by weight of magnesium and 20% by weight of graphite (particle diameter 170–500μm) with the balance being aluminum. These alloys have been prepared in the same manner as described above with respect to the sample shown in FIGS. 1 and 4. In each alloy, the nickel content is 3.3% by weight. The alloy of curve No. 3 is a sintered alloy comprising 5% by weight of copper and 5% by weight of graphite (particle diameter 170–500μm) with the balance being aluminum, and the alloy of curve No. 4 is a sintered alloy comprising 4.5% by weight of tin, 2% by weight of germanium, 3% by weight of lead and 7.5% by weight of chromium with the balance being aluminum. As will be apparent from the results shown in FIG. 3, the abrasion is much reduced in each of the samples according to the present invention, and it is confirmed that the alloy of the present invention has an abrasion resistance at least 3 times as high as the abrasion resistance of the conventional copper or aluminum type sintered alloy.

EXAMPLE 5

An alloy comprising 12% by weight of silicon, 3% by weight of copper, 0.3% by weight of magnesium and 5% by weight of molybdenum disulfide (particle diameter 170–500μm) with the balance being aluminum is prepared by the melting method. Since the specific gravity of molybdenum disulfide is higher than that of the aluminum alloy matrix, it tends to sink. Accordingly, by effecting gradual cooling, the alloy comes to have a two-layer structure comprising a molybdenum disulfide-containing layer and a molybdenum disulfide-free layer. When this alloy is subjected to the abrasion test in the same manner as in Example 4, the abrasion of the alloy of this Example is the same as in the collector of the present invention shown in FIG. 3, and also the alloy of this Example is excellent in the abrasion resistance. The tensile strength of the molybdenum disulfide-containing layer of the alloy of the present invention is 18 Kg/mm² in the as-cast state.

EXAMPLE 6

The composite collector of the present invention having a graphite-dispersed layer and a graphite-free layer at a ratio of 1:1 (each thickness is 10 mm) and being composed of an alloy comprising 10% by weight of graphite (particle diameter 170–500μm), 12% by weight of silicon, 3% by weight of copper and 0.3% by weight of magnesium with the balance being aluminum has a tensile strength as high as 19 Kg/mm² in the as-cast state. For comparison, the tensile strength of an as-cast collector formed by dispersing 5% by weight of graphite uniformly in the entire collector is 17 Kg/mm². It has thus been confirmed that if the graphite-free layer is formed and the graphite content is doubled to 10% by weight in the graphite-dispersed layer according to the present invention, the tensile strength can be improved while the abrasion resistance is enhanced by at least 2 times.

It has also been found that although all of the graphite-dispersed layer of the conventional collector material cannot be utilized effectively, in the collector material of the present invention substantially all of the graphite-dispersed layer can be utilized effectively.

As will be apparent from the foregoing illustration, the collector material of the present invention is excellent in the abrasion resistance and has a high strength. Further, it has a durability at least 1.5 times as high as the durability of the conventional collector material. Accordingly, excellent effects can be attained according to the present invention.

What is claimed is:

1. A composite collector for collecting and passing an electric current in sliding contact, which is constructed of an integral cast body of metal and comprises on one side providing an electric current-passing sliding surface a layer containing from 5 to 50% by weight of particles of a solid lubricant having a particle size of up to 2.5 mm, dispersed in a matrix of said metal, and a layer composed solely of the metal and free of the solid lubricant on the side of the surface opposite to said sliding surface.

2. A composite collector as set forth in claim 1, wherein there is no solid-soluble compatibility between the matrix of said metal and the solid lubricant.

3. A composite collector as set forth in claim 1, wherein the difference of the specific gravity between the matrix of said metal and the solid lubricant is at least 10%.

4. A composite collector as set forth in claim 1, wherein the layer containing said solid lubricant is at leat one-fifth the thickness of the body.

5. A composite collector as set forth in claim 1, wherein the metal layer on the side of the surface opposite to the sliding surface has a tensile strength of at least 7.5 Kg/mm² at room temperature, a specific resistance of up to 200 $\mu\Omega$-cm and a melting point lower than 1600° C.

6. A composite collector as set forth in claim 1, wherein the specific gravity of the matrix of said metal is not higher than 3 g/cm³.

7. A composite collector as set forth in claim 1, wherein there is no solid-soluble compatibility between the matrix of said metal and the solid lubricant, the difference of the specific gravity between the matrix of said metal and the solid lubricant is at least 10%, the specific gravity of the matrix of said metal is not higher than 3 g/cm³, and the metal layer on the side of the surface opposite to the sliding surface has a tensile strength of at least 7.5 Kg/mm² at room temperature, a specific resistance of up to 200 $\mu\Omega$-cm and a melting point lower than 1600° C.

8. A process for the preparation of a composite collector which comprises adding a metal coated solid lubricant in particulate form to a melt of a substrate metal, maintaining the metal melt in the molten state so that a layer not containing the solid lubricant and a layer containing the solid lubricant in a dispersed state are formed in the metal melt, and solidifying the melt in a casting mold at such a speed that said layers are retained in the resulting cast metal structure.

9. A process for the preparation of a composite collector according to claim 8, wherein the particulate solid lubricant is coated with a metal having a wettability with the substrate metal.

10. A process for the preparation of a composite collector according to claim 8, wherein the solid lubricant has a particle size of up to 2.5 mm.

11. A process for the preparation of a composite collector according to claim 8, wherein the difference of the specific gravity between the substrate metal and the solid lubricant is at least 10%.

12. A process for the preparation of a composite collector according to claim 8, wherein the content of the solid lubricant is 5 to 50% by weight in the lubricant-containing portion of the collector.

13. A process for the preparation of a composite collector according to claim 8, wherein the metal layer on the side of the surface opposite to the sliding surface has a tensile strength of at least 7.5 Kg/mm² at room temperature, a specific resistance of up to 200 $\mu\Omega$cm and a melting point lower than 1600° C.

14. A process for the preparation of a composite collector according to claim 8, wherein there is no solid-soluble compatibility between the substrate metal and the solid lubricant, the difference of the specific gravity between the substrate metal and the solid lubricant is at least 10%, the content of the solid lubricant is 5 to 50% by weight, the specific gravity of the substrate metal is not higher than 3 g/cm³, and the metal layer on the side of the surface opposite to the sliding surface has a tensile strength of at least 7.5 Kg/mm² at room temperature, a specific resistance of up to 200 $\mu\Omega$-cm and a melting point lower than 1600° C.

15. A process for the preparation of a composite collector according to claim 8, wherein the layer containing said solid lubricant has a thickness that is at least one-fifth the thickness of the cast metal structure.

16. A process for the preparation of a composite collector which comprises adding a particulate lubricant to a melt of a metal having a specifig gravity different from that of said lubricant and being metallurgically compatible with said lubricant, maintaining the melt in a molten state until a first layer of said metal which is free of said lubricant is formed adjacent to a second layer of a prescribed thickness in which said lubricant is dispersed and solidifying the melt.

17. A process for the preparation of a composite collector according to claim 16, further comprising casting the melt into a mold, after adding of the particulate lubricant to the melt of the metal.

18. A process for the preparation of a composite collector according to claim 16, wherein the specific gravity of the metal is not higher than 3 g./cm³.

19. A process for the preparation of a composite collector according to claim 16, wherein the metal is aluminum and said lubricant is graphite powder.

20. A process for the preparation of a composite collector according to claim 19, wherein the metal is an aluminum-silicon alloy containing silicon in an amount of from 5 to 25% by weight.

21. A process for the preparation of a composite collector which comprises adding a metal coated graphite powder to a melt of a substrate metal consisting essentially of from 5 to 25% silicon, 0.5 to 10% copper, up to 1% magnesium and the balance being aluminum, the metal coated on said graphite being at least one selected from the group consisting of nickel, copper and cobalt and the graphite powder having a particle size of up to 2.5 mm., casting the melt containing said graphite powder into a mold, maintaining the melt in the molten state until a first layer of said substrate metal which is free of said lubricant is formed adjacent to a second layer of a prescribed thickness in which said lubricant is dispersed in an amount of from 5 to 50% by weight, and solidifying the melt.

* * * * *